(12) United States Patent
Walton

(10) Patent No.: US 7,438,537 B2
(45) Date of Patent: Oct. 21, 2008

(54) LIQUID ADDITIVE INJECTION PUMP WITH MIXING CHAMBER AND ONE WAY VALVE

(75) Inventor: Frank A. Walton, Ft. Worth, TX (US)

(73) Assignee: Dosmatic USA, Inc., Carrollton, TX (US)

( * ) Notice: Subject to any disclaimer, the term of this patent is extended or adjusted under 35 U.S.C. 154(b) by 365 days.

(21) Appl. No.: 11/076,129

(22) Filed: Mar. 9, 2005

(65) Prior Publication Data

US 2006/0204376 A1    Sep. 14, 2006

(51) Int. Cl.
*F04B 17/00* (2006.01)
*F04B 35/00* (2006.01)

(52) U.S. Cl. .................................. 417/375; 417/403

(58) Field of Classification Search ............... 417/375, 417/403

See application file for complete search history.

(56) References Cited

U.S. PATENT DOCUMENTS

| | | | |
|---|---|---|---|
| 3,963,038 A | 6/1976 | Jensen | |
| 4,030,495 A * | 6/1977 | Virag | 604/123 |
| 4,084,606 A * | 4/1978 | Mittleman | 137/102 |
| 4,199,083 A | 4/1980 | LoMaglio | |
| 4,558,715 A | 12/1985 | Walton et al. | |
| 4,729,401 A * | 3/1988 | Raines | 137/512 |
| 4,809,731 A | 3/1989 | Walton et al. | |
| 5,137,435 A | 8/1992 | Walton | |
| 5,513,963 A | 5/1996 | Walton | |
| 5,683,232 A * | 11/1997 | Adahan | 417/440 |
| 6,453,940 B1 * | 9/2002 | Tipton et al. | 137/493.9 |

* cited by examiner

*Primary Examiner*—Devon C Kramer
*Assistant Examiner*—Patrick Hamo
(74) *Attorney, Agent, or Firm*—Colin P. Cahoon; Carstens & Cahoon, LLP

(57) ABSTRACT

A liquid additive injection pump for injecting a predetermined amount of a secondary fluid into a primary fluid stream wherein a fluid mixing chamber is disposed within the pump housing assembly. A gasket having at least one one-way valve is positioned between the pump assembly components and mixing chamber thereby allowing a primary fluid to pass through the pump assembly and into the mixing chamber where the introduction of a second fluid occurs. The mixed fluids are then discharged through an outlet. The one-way valve gasket assembly acts to prevent the mixed and/or secondary fluid from passing upstream of the gasket assembly and into the pump assembly.

11 Claims, 5 Drawing Sheets

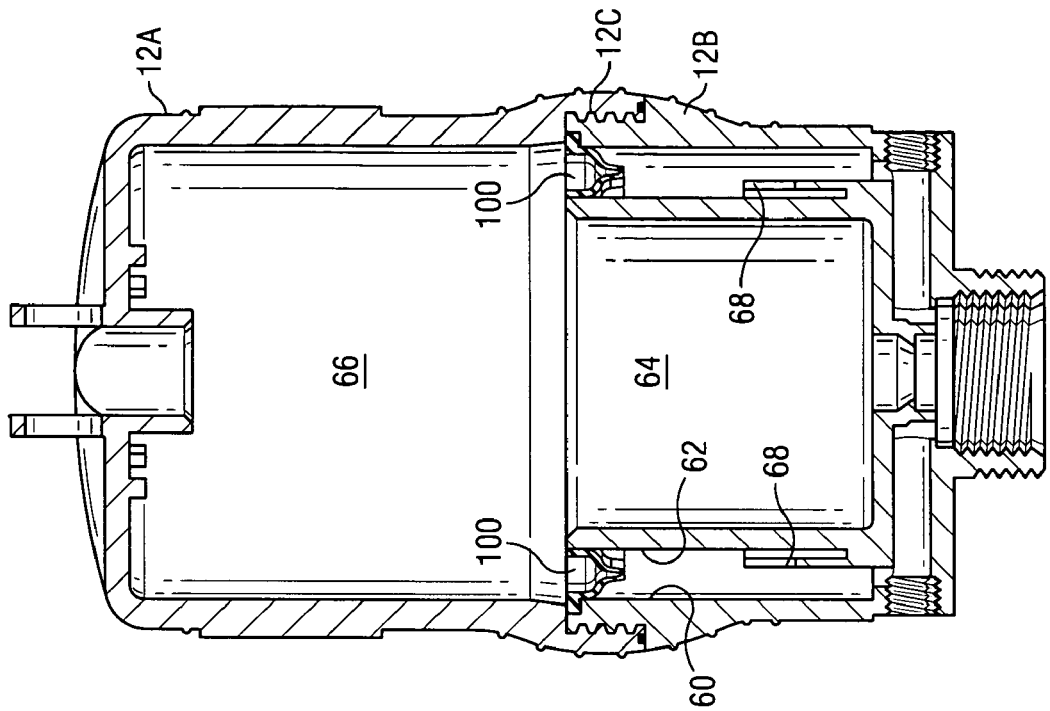
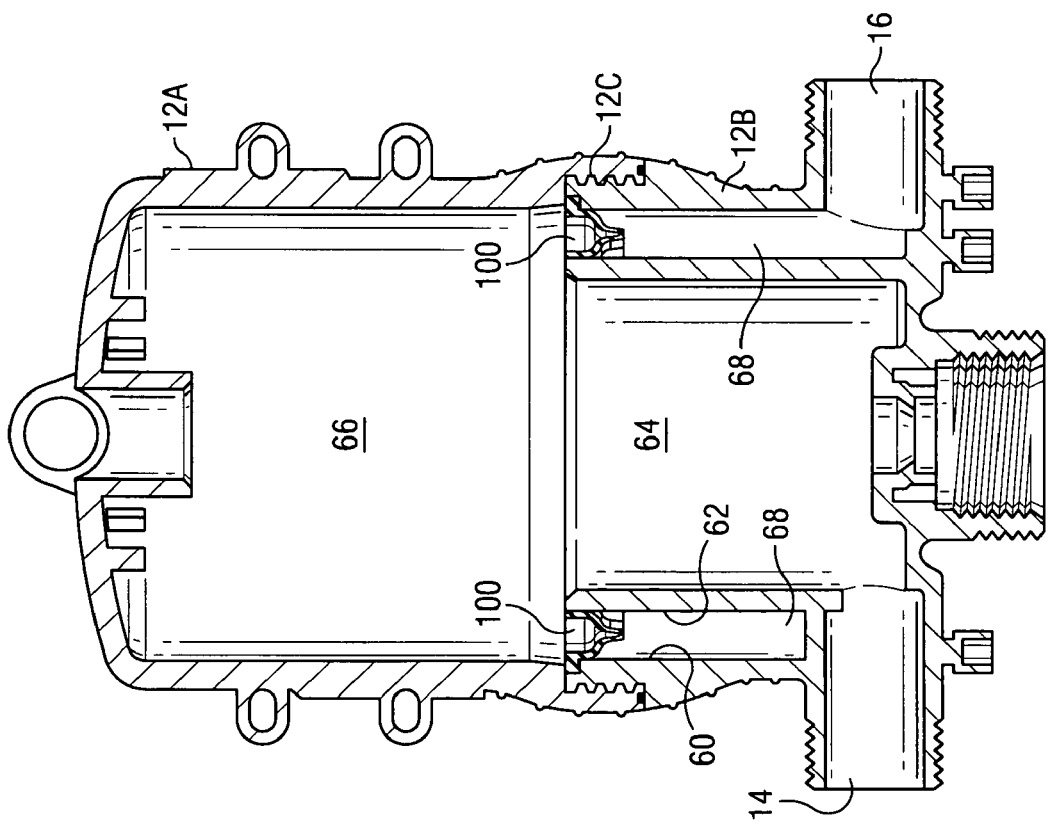

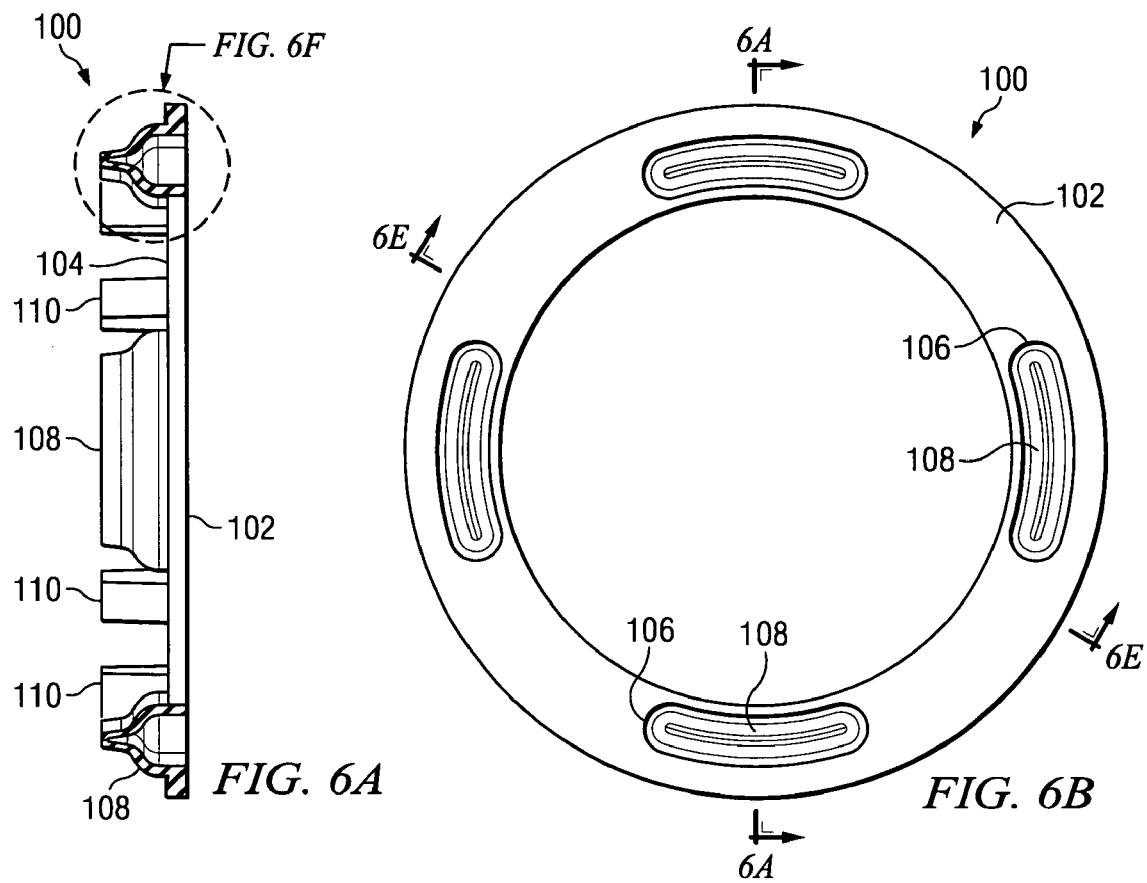
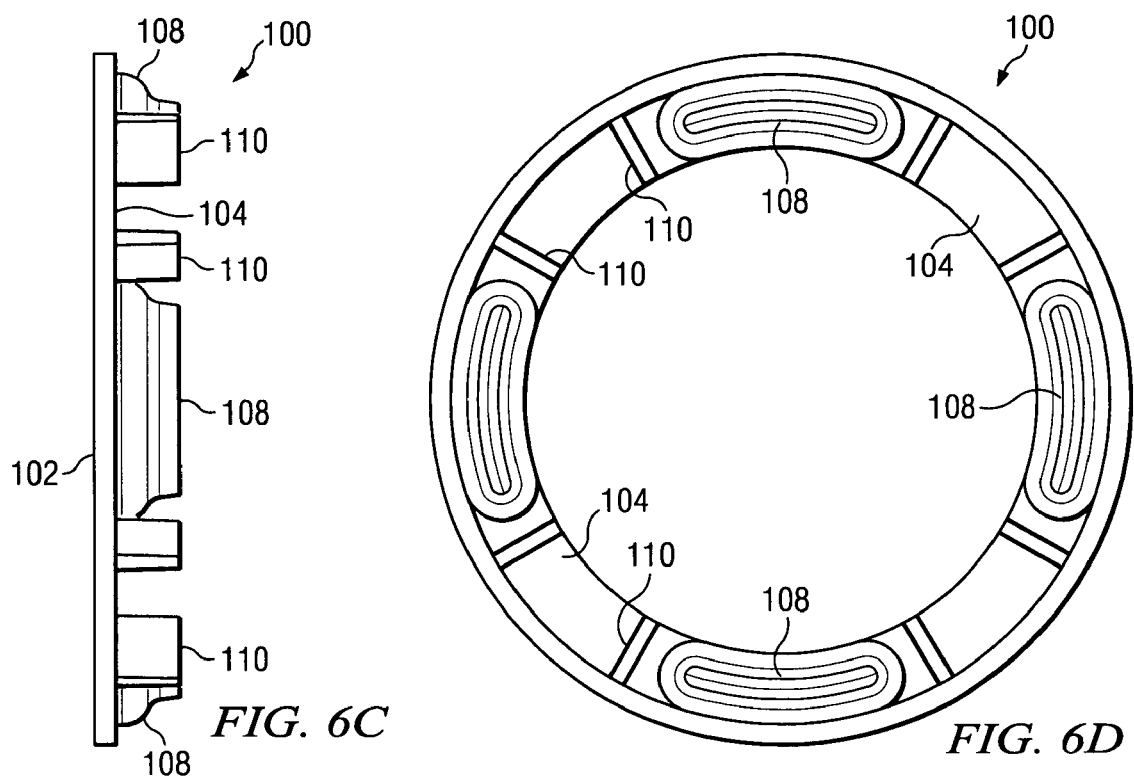

LIQUID ADDITIVE INJECTION PUMP WITH MIXING CHAMBER AND ONE WAY VALVE

BACKGROUND OF THE INVENTION

1. Technical Field

The present invention relates generally to a liquid additive injection pump for injecting a predetermined amount of a secondary fluid into a primary fluid stream, said pump driven by a fluid powered motor. More specifically, the present invention relates to a liquid additive injection pump having an external mixing chamber separated from the fluid-powered-motor components by a one-way valve gasket assembly.

2. Description of Related Art

Fluid powered motors driving an additive injection pump connected to a source of fluid additives are typically installed in a line containing primary fluid under pressure. The primary fluid produces reciprocating movement of a piston assembly within a housing of the fluid motor. The fluid motor in turn reciprocates a piston within a cylinder of the additive injection pump to draw a quantity of secondary fluid into the primary fluid. Such devices have been applied to add medication to drinking water for poultry and livestock, treat water with additives, add fertilizer concentrate to irrigation water, or add lubricant or cleaning agents to water. In liquid additive injection pumps, such as that shown in U.S. Pat. No. 4,558,715, reciprocating movement of the piston assembly is produced by a valve mechanism operable to establish a differential pressure. Specifically, opening and closing of the valve mechanism synchronized to the upstroke and down stroke positions of the piston assembly produces a pressure differential that moves the piston through its reciprocating cycle. Opening and closing of the valve mechanism is synchronized to the piston assembly by an over-center mechanism, which is actuated coincident with the piston assembly reaching the ends of its upstroke and down stroke positions. The over-center mechanism is spring-biased and serves to toggle the valve mechanism open and closed when an actuating shaft carried by the piston assembly engages stops that define the ends of its upstroke and down stroke excursions.

Certain fluids, however, can be quite corrosive, and still others may cause corrosive or otherwise harsh chemical reactions when mixed with a second fluid. Corrosive fluids and harsh chemical reactions can damage the pumping elements. Thus, a need exists for a differential-pressure piston-type fluid injection pump having a separate mixing chamber downstream of the pumping/metering elements. Furthermore, a need exists for a simple mechanism for preventing backflow from the separate mixing chamber into the pumping/metering elements.

Further objects of this invention will be apparent to persons knowledgeable with devices of this general type upon reading the following description and examining the accompanying drawings.

SUMMARY OF THE INVENTION

In accordance with the foregoing objects, the present invention is an apparatus and system for injecting a predetermined amount of a secondary fluid into a primary fluid stream wherein a liquid additive injection pump is driven by a fluid powered motor, which in turn is driven by the primary fluid stream, and can be selectively suspended by an on/off switch mechanism if desired. A pump housing, which contains the pumping components of the fluid powered motor, also contains a mixing chamber apart from the pumping components.

In a preferred embodiment of the present invention, the fluid powered motor includes a housing enclosing a differential pressure piston assembly having a piston movable within a housing between upstroke and down stroke positions; a valve mechanism establishing a differential pressure within the housing to produce movement of the piston; an over-center mechanism coupled to the valve mechanism to toggle the valve mechanism between open and closed positions; an actuating shaft coupled to the over-center mechanism, the actuating shaft including a piston upstroke stop that causes toggling of the valve mechanism at an upstroke position of the piston during normal reciprocating movement of the piston; a mixing chamber that is in fluid communication with the pump discharge and is separate from the fluid powered motor; a gasket having one or more one-way valves for allowing the primary fluid to pass into the mixing chamber for mixing with the secondary fluid, while preventing the secondary and/or the mixed fluids within the mixing chamber from passing upstream of the gasket into the pump housing.

Many other features, objects and advantages of the present invention will be apparent to those of ordinary skill in the relevant arts, especially in light of the foregoing discussions and the following drawings, exemplary detailed description and appended claims.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings wherein:

FIG. 4 is a side cross-sectional view of the pump housing with a separate mixing chamber;

FIG. 5 is another side cross-sectional view of the pump shown in FIG. 4; and FIGS. 6a-6f are five views of the one-way-valve gasket in preferred embodiment.

DETAILED DESCRIPTION OF THE INVENTION

A preferred embodiment of the invention is disclosed herein as shown in FIGS. 1 through 6f.

Figure 1:
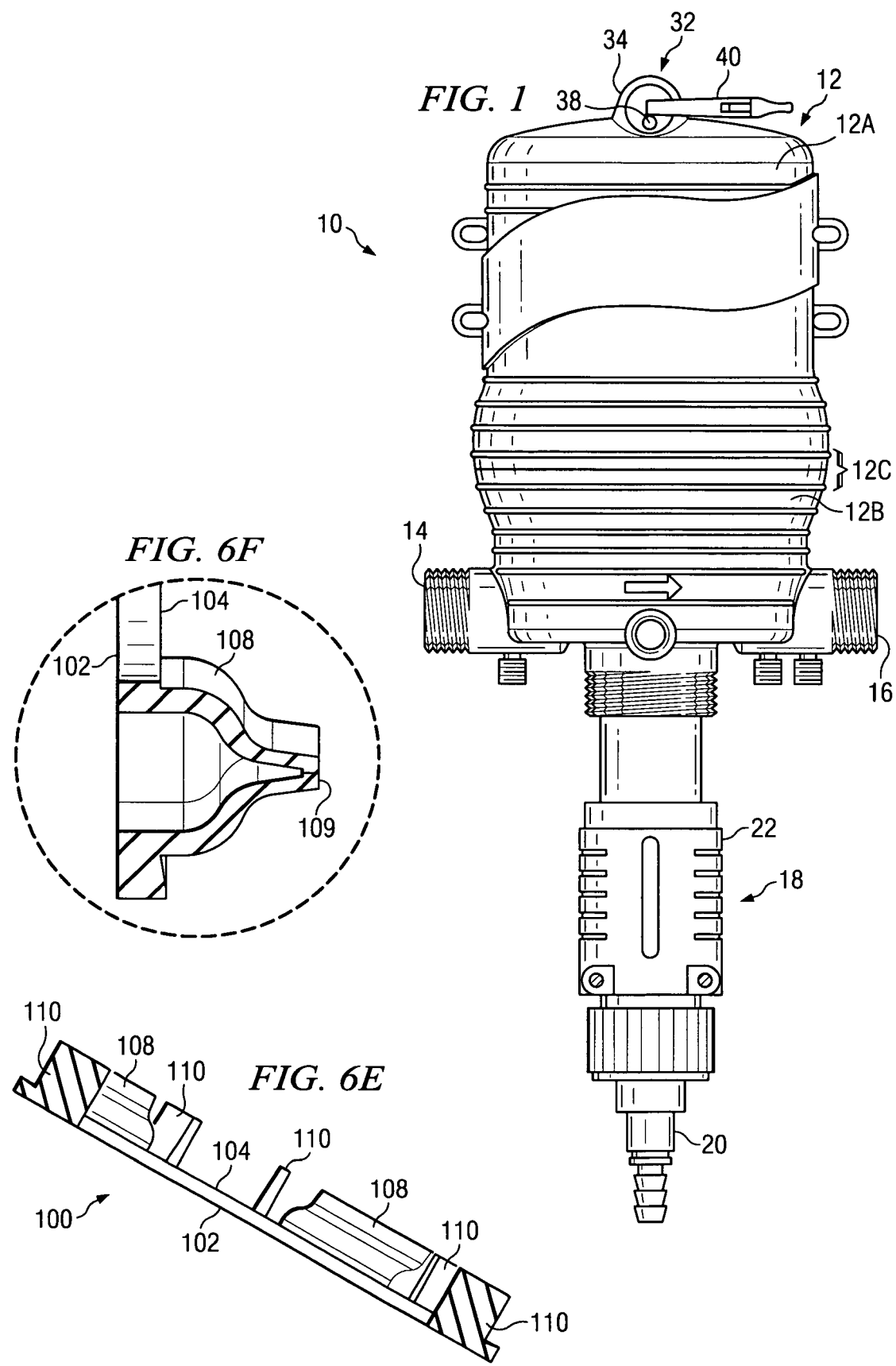
FIG. 1 is an elevated side view of an entire pump in a preferred embodiment.
Figure 2:
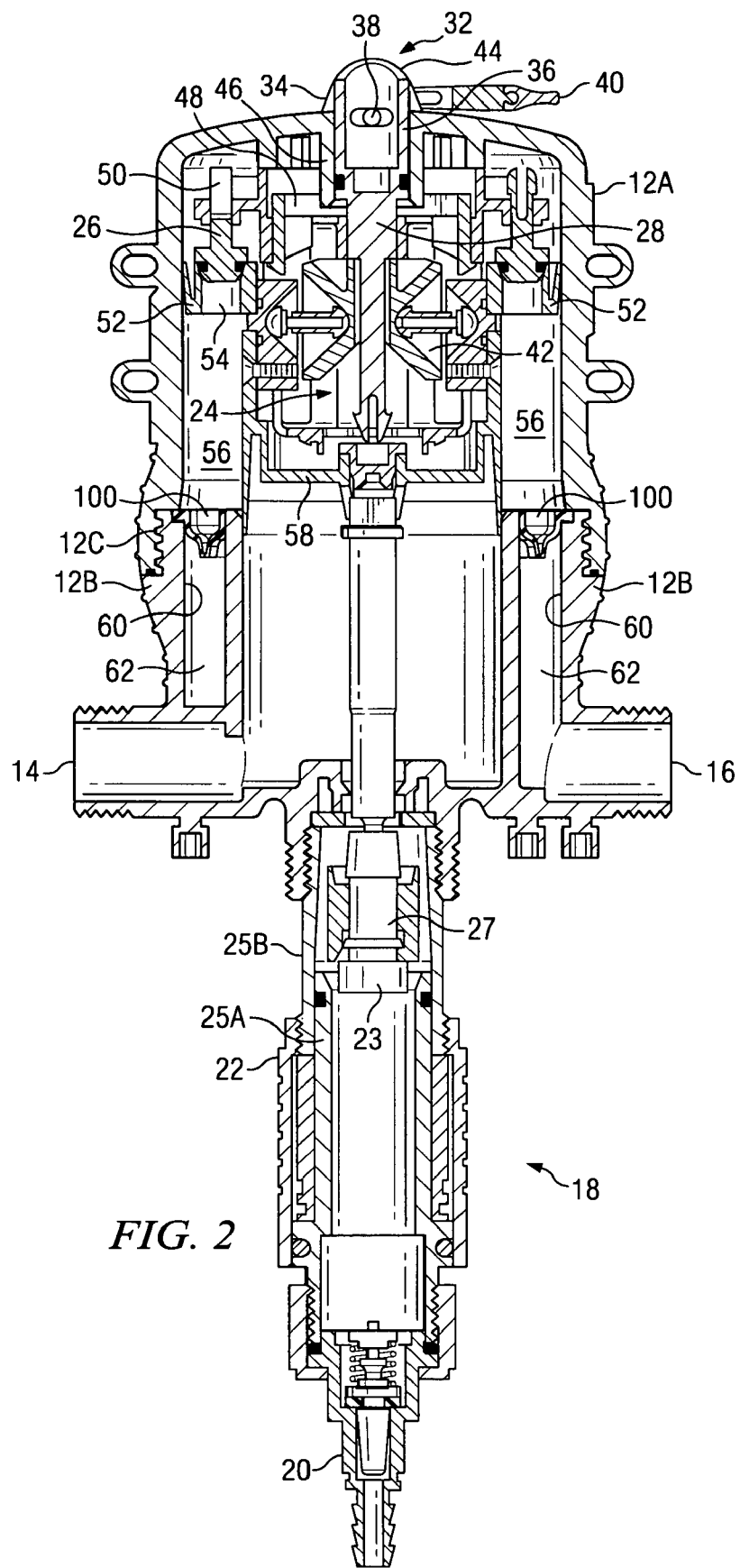
FIG. 2 is a side cross-sectional view of the entire pump in a preferred embodiment.

FIG. 1 is an elevated side view of an entire pump in a preferred embodiment, and FIG. 2 is a side cross-sectional view of the pump shown in FIG. 1. In FIGS. 1 and 2, a fluid powered motor 10 is shown. A housing 12, including cover 12A and lower body 12B, which are secured together at their interface 12C and internally separated by one-way-valve gasket, encloses the fluid powered motor components. An inlet conduit 14 provides for acceptance of a primary fluid stream, and an outlet conduit 16 discharges the primary fluid stream. Coupled to the fluid powered motor 10 is a liquid additive injection pump 18. An inlet conduit having a fitting 20 provides for acceptance of a liquid additive. The liquid additive is drawn into the pump 18 from an additive reservoir (not shown) and injected into the primary fluid stream. Metering of the liquid additive is adjustable by a ratio adjustment sleeve 22. The liquid additive injection pump 18 includes a dosage piston 23, which is movable within an inner cylinder 25A and outer cylinder 25B by connecting piston rod 27. The fluid powered motor 10 is coupled to the connecting piston rod 27 to drive the liquid additive injection pump.

The internal components of the fluid powered motor 10 within housing 12 include a piston assembly 24. A valve mechanism 26 is carried on the piston assembly 24 and includes four poppet valves 26, which are shown seated and closing off four respective piston-top channels 54. The piston itself has a larger-diameter upper part 52 and a smaller-diameter lower part 58. The lower part of the piston 58 fits precisely but slidably within an inner cylinder wall 62 of the housing lower body 12. Likewise, the upper part of the piston 52 fits precisely but slidably within the housing cover 12A. An actuator shaft 28 extends through the piston assembly 24 and is coupled to an over-center mechanism 42 that actuates the valve mechanism 26. Opening and closing of the valve mechanism 26 at the upstroke and down stroke positions of the piston creates a differential pressure within the housing 12 effective to produce reciprocating movement of the piston assembly 24. The internal components of fluid powered motor 10 constitute what is termed a "differential pressure reciprocating piston assembly."

At the top of the housing 12 is an on/off switch mechanism 32. A sleeve 34 extends from the top of the housing 12. An insert 36 (not shown) is axially movable relative to the sleeve 34 by actuation of a cam mechanism 38 using handle 40. The handle rotates through an arc of 180 degrees as it is thrown from side-to-side between the "on" and "off" positions of the switch mechanism 32. The switch mechanism 32 is shown in the "on" position in FIGS. 1 and 2. In the "on" position of the switch mechanism, the insert 36 is fully inside sleeve 34. The insert 36 is coupled to the actuator shaft 28 to establish the vertical position of the shaft relative to the housing cover 12A. Although shown in the figures, an on/off switch can be omitted if desired.

Also illustrated in FIGS. 1 and 2 is the coupling of the actuator shaft 28 to the insert 36. In the illustrated embodiment, the actuator shaft 28 and the insert 36 are integrally formed as a single unit. Cap 44 sits atop the insert 36. When the switch mechanism is in the "off" position, protrusion of the actuator shaft 28 from the housing cover 12A provides visual indicia of the condition of the switch mechanism as being "off." The portion of the actuator shaft 28 that protrudes from the housing cover 12A may be colored to assist in providing the visual indicia of the condition of the switch mechanism.

As seen in FIG. 2, the actuator shaft 28 includes a circumferential shoulder 46, which is aligned to be engaged by a collar extension 48 on the piston assembly 24. As will be appreciated, when piston assembly 24 moves in the upstroke excursion, the inner collar extension 48 will engage the shoulder 46. When the collar extension 48 engages the shoulder 46, the valve mechanism 26 is moved to the closed position, and the over-center mechanism 42 is triggered to toggle into a position that maintains closure of the valve mechanism. Upon closure of the valve mechanism, a differential pressure is created that causes the piston assembly to begin moving in the down stroke excursion portion of its reciprocating cycle. In the position of the actuator shaft 28 shown in FIGS. 1 and 2, the range of movement of the piston assembly to the end of its upstroke permits the over-center mechanism to fully toggle. As will also be appreciated, the over-center mechanism forms a bi-stable device that establishes the valve mechanism alternately in open and closed positions. With the actuator shaft 28 in the "on" position, normal operation providing reciprocating movement of the piston assembly 24 can continue.

When the handle of the on/off switch mechanism 32 are moved to the "off" position, the insert 36 and the attached actuator shaft 28 are displaced to the offset position. As will be appreciated, when the piston assembly 24 moves in the upstroke excursion, the inner collar extension 48 cannot engage the shoulder 46 because the outer collar extension 50 will engage the top of the housing cover 12A ahead of time. As a consequence, the valve mechanism 26 will not close to create the differential pressure within the housing 12 that is necessary to move the piston assembly 24 in the down stroke excursion portion of its reciprocating cycle. Also, although the over-center mechanism 42 will be partially moved, it will not fully toggle. Normal reciprocating movement operation of the piston assembly 24 will not continue, and liquid additive will no longer be injected into the primary fluid stream. Upon movement of the handle 40 to the "on" position, however, the inner collar extension 48 will engage the shoulder 46 on the actuator shaft 28. The valve mechanism will close, and the over-center mechanism will complete toggling. The necessary differential pressure required for reciprocating movement of the piston assembly 24 will be re-established within housing 12, and normal operation will resume.

Figure 3:
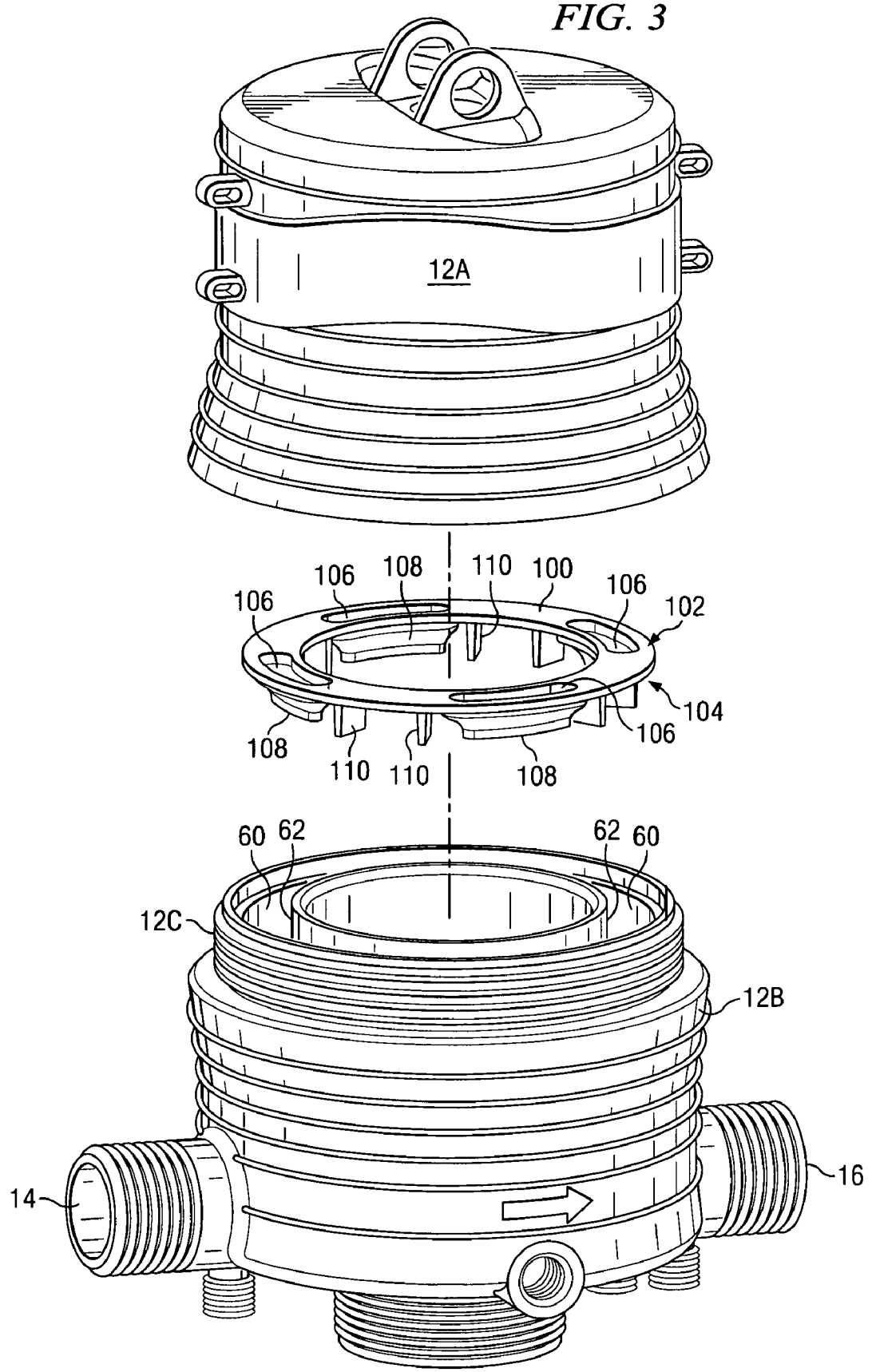
FIG. 3 is a perspective view of upper and lower halves of the pump housing with a one-way-valve gasket in a preferred embodiment.

FIG. 3 is a perspective view of the upper and lower halves of the pump housing (housing cover 12A and lower body 12B) with a one-way-valve gasket 100 removeably secured between housing cover 12A and lower body 12B in a preferred embodiment; FIG. 4 is a side cross-sectional view of the pump showing the assembly and isolated fluid mixing chamber; FIG. 5 is another side cross-sectional view of the pump shown in FIG. 4; and FIGS. 6a through 6f are five different views of the one-way-valve gasket assembly in a preferred embodiment.

Referring to FIGS. 3 through 6F, the lower body 12B has a threaded collar 12C for mating with the housing cover 12A, which has corresponding threading around its bottom, inner circumference. The lower body 12B has an outer cylinder wall 60 and an inner cylinder wall 62 which define a lower, exiting cylindrical channel/volume 68 (or "separate chamber") that leads to the primary fluid exit 16. The inner cylinder wall 62 contains the lower part of the piston 58 (shown in FIG. 2) and encloses a variable-size lower cavity 64 (the volume of which is varied by the piston position) into which primary fluid enters from the primary fluid inlet 14. After making its way through the piston assembly 24 shown in FIG. 2, primary fluid enters a variable-size upper cavity 66 (the volume of which is varied by the piston position). Upon the down-stroke of the piston assembly 24 (as shown in FIG. 2), a metered volume of primary fluid within the upper cavity 66 and below the larger-diameter portion of the piston 52 is pushed downward through the one-way-valve gasket 100 and into the lower, exiting, post-gasket cylindrical channel/volume 68, which then leads the primary fluid out through the pump exit 16. Then, upon the up-stroke of the piston assembly 24 (as shown in FIG. 2), the liquid additive injection pump 18 (shown in FIG. 2) pushes a metered volume of fluid additive into either the post-gasket channel 68 or an external mixing chamber to combine with the exiting primary fluid, whichever is desired. For example, fluid additive can be routed from the liquid additive injection pump 18 (shown in FIG. 2) through a port into the post-gasket channel 68, thereby enabling the primary and additive fluids to mix within the pump without contacting the actual pumping elements. The one-way-valve gasket 100 prevents any fluid additive from flowing upstream into the upper part of the housing. Alternatively, a separate mixing chamber can be provided after the pump discharge 16, and the metered volumes of primary fluid and fluid additive can be directed into such separate mixing chamber. Again, the one-way-valve gasket 100 prevents any fluid additive from flowing upstream into the upper part of the housing. In either case, the walls of the separate mixing chamber and/or the post-gasket channel can be lined or protected with corrosion-resistant or corrosion-retardant materials without the requirement to necessarily protect other portions or components of the pump. This is especially beneficial where use of corrosion-resistant or corrosion-retardant materials throughout the entire pump would be cost-prohibitive, mechanically-prohibitive, or otherwise not feasible.

FIGS. 6A through 6F show, in more detail, various views of the one-way-valve gasket 100 in a preferred embodiment. The one-way-valve gasket 100 comprises a generally-flat ring of any non-pervious, slightly-to-fairly pliable material, except for several curved, nipple-type valves 108 extending downward from the ring. The upper surface 102 and lower surface 104 are flat in the gasket's outer perimeter so that the gasket 100 can rest flush between the tiered (or flanged) bottom surface of the housing cover 12A (shown FIG. 1) and the tiered (or flanged) upper surface of the lower housing body 12 (shown in FIG. 2). The nipple-type valves 108 extend downward from corresponding gaps 106 in the gasket ring 100, through which primary fluid can pass downward but not upward when the valves point downward. In order for the nipple-type valves 108 to work properly, they must be made of a material whose thickness and flexibility are such that their angled ends 109 will open with typical piston-pumping fluid pressures but will also remain closed against fluid backflows of foreseeable pressures. The gasket 100 also has several radial supporting fins 110 that extend from, and are perpendicular to, the gasket ring 100. These supporting fins 110 fit snugly in a radial fashion across the cylindrical channel/volume 68 between the lower body's 12B outer cylinder wall 60 and an inner cylinder wall 62 (as shown in FIG. 3).

Note, however, that the liquid additive injection pump having a fluid mixing chamber separated from the fluid-powered-motor components by a one-way-valve gasket of the present invention is subject to application and modification by those of ordinary skill in the art. Although the present invention has been described in terms of an exemplary embodiment, it is not limited to these embodiments and modifications. Alternative embodiments, modifications, and equivalents, which would still be encompassed by the invention, may be made by those of ordinary skill in the art, in light of the foregoing teachings. Therefore, the following claims are intended to cover any alternative embodiments, modifications, or equivalents which may be included within the spirit and scope of the invention defined by the claims.

What is claimed is:

1. An apparatus for introducing a secondary fluid into a primary fluid, comprising:
   a fluid powered motor driven by a primary fluid stream;
   a liquid additive injection pump driven by the fluid powered motor;
   a lower housing body secured to the housing cover wherein the lower housing body includes an outer cylinder wall and an inner cylinder wall defining a fluid mixing chamber; and
   a gasket ring removeably secured between the housing cover and the lower housing body, wherein said gasket ring comprises an outer perimeter and at least one gap, wherein said at least one gap is located on the outer perimeter of said gasket ring, and wherein each gap comprises a corresponding one-way valve, and wherein the one-way valve allows the primary fluid stream to pass into the fluid mixing chamber.

2. The apparatus of claim 1 further comprising;
   a piston, movable between upstroke and down stroke positions, enclosed within a piston-assembly space defined by the inner cylinder wall, the gasket, and the housing cover.

3. The apparatus of claim 1 further comprising:
   a valve mechanism establishing a differential pressure within the housing to produce movement of the piston.

4. The apparatus of claim 1 further comprising:
   an over-center mechanism coupled to the valve mechanism to toggle the valve mechanism between open and closed positions.

5. The apparatus of claim 1 further comprising:
   an actuating shaft coupled to the over-center mechanism, the actuating shaft including a piston upstroke stop that causes toggling of the valve mechanism at an upstroke position of the piston during normal reciprocating movement of the piston.

6. The apparatus of claim 1 further comprising:
   a primary fluid inlet feeding directly into the piston-assembly space; and,
   a fluid discharge outlet in fluid communication with the mixing chamber.

7. The apparatus of claim 1 wherein said one-way valve gasket further comprises at least one nipple-type one-way valve.

8. The apparatus of claim 1 wherein said one-way valve gasket comprises one of rubber or polyurethane.

9. A method for introducing a secondary fluid into a primary fluid stream, comprising:
   introducing a primary fluid into a fluid pump assembly;
   pumping the primary fluid into a fluid mixing chamber via a removeably secured gasket ring comprising an outer perimeter and at least one gap, wherein said at least one gap is located on the outer perimeter of said gasket ring, and wherein each gap comprises a corresponding one-way valve; and,
   injecting a secondary fluid into the fluid mixing chamber.

10. The method of claim 9 wherein said one-way valve moves to the closed position when the flow of fluid from the pump assembly to the mixing chamber reverses direction.

11. The method of claim 9 wherein the one-way valve moves to the closed, position when the fluid pressure in the mixing chamber exceeds the fluid pressure in the pump assembly.

* * * * *